United States Patent Office 2,961,869
Patented Nov. 29, 1960

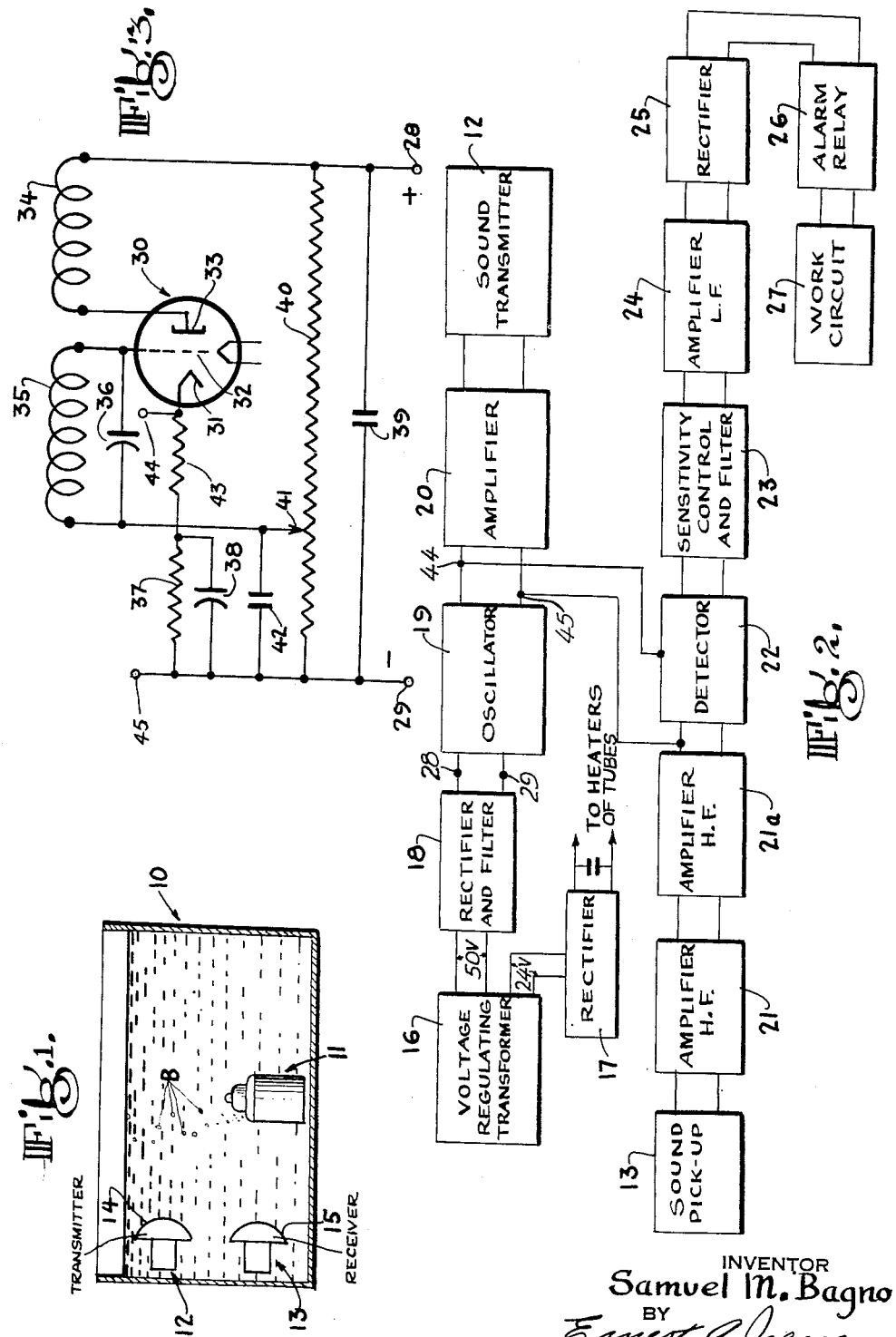

2,961,869

LEAKAGE TESTING APPARATUS AND METHOD OF TESTING

Samuel M. Bagno, Belleville, N.J., assignor to Walter Kidde & Company, Inc., Belleville, N.J., a corporation of New York Filed Aug. 7, 1956, Ser. No. 602,601

12 Claims. (Cl. 73—45.5)

The present invention relates to testing sealed containers, and, more particularly, to testing apparatus for detecting the leakage of a gaseous fluid from a container confining the same.

For many years, it has been customary to test sealed containers to detect the leakage of a gaseous fluid therefrom by immersing the containers in a bath of liquid such as water and placing a transparent hood over the portion of the containers where leakage was likely to occur which served to trap gas bubbles resulting from leakage. After immersion of the containers for a predetermined length of time, visual observations were made to detect the existence of bubbles and to determine the number and size thereof.

One of the difficulties with this method of testing is that certain gaseous fluids produce such small bubbles that visual detection and counting thereof are not feasible or are very unreliable. Also, the observer is fallible. Another difficulty is that it is required to keep the containers immersed for a considerable length of time to detect leakage, particularly in cases where the leakage bubbles are small and infrequent. A further difficulty is that this method is not feasible for testing containers which have leakage points at remote locations thereof or are of a size or shape prohibiting the use of a hood.

Accordingly, an object of the present invention is to provide leakage testing apparatus which is not subject to the foregoing disadvantages.

Another object is to provide apparatus which detects leakage automatically and does not depend on visual observations of bubbles.

A further object is to provide such apparatus which is relatively simple, economical, highly reliable, and accurate and rapid in operation.

A still further object is to provide such apparatus which is extremely sensitive but is not affected by ambient disturbances.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing testing apparatus which comprises means for generating energy of a given high frequency, for example, at a frequency of about one megacycle per second, means for radiating the energy into the liquid, means adapted to be submerged in the liquid in which the containers to be tested are immersed for receiving the energy, means electrically connected to the generating means and the receiving means for detecting a difference in frequency between the signal generated and the signal received such as caused by a bubble of gaseous fluid escaping from the containers and passing upwardly through the liquid, indicating means including a work circuit, if desired, and means for effecting operation of the indicating means in response to the detection of a frequency difference.

The last mentioned means preferably include a filter for passing a given band of frequencies, for example, frequencies between about 100 and 300 cycles per second, whereby small bubbles can be detected and ambient disturbances such as caused by ripples or other slow moving objects or by noises at frequencies approaching the audible ranges do not adversely affect the functioning of the detecting means. Also, the generating means are of the low noise type to eliminate the radiation of frequencies falling within the band of frequencies passing the filter.

Such apparatus operates on the Doppler principle in the respect that, in the absence of bubbles, the generated and received frequencies are the same and no Doppler effect is detected. However, the motion of bubbles towards and away from the radiated waves of energy respectively increases and decreases the frequency of the energy received to produce a Doppler effect, whereby the difference between the generated and received frequencies is detected to indicate the presence of one or more bubbles.

A preferred embodiment of the invention has been chosen for purposes of illustration and description, and is shown in the accompanying drawing, forming a part of the specification, wherein:

Fig. 1 is a schematic view of a receptacle filled with liquid in which a container is immersed for testing the same with the apparatus in accordance with the present invention.

Fig. 2 is a block diagram illustrating the components of the electrical network embodied in the apparatus.

Fig. 3 is a circuit diagram of the high frequency energy generating means.

Referring to the drawing in detail and more particularly Fig. 1 thereof, there is shown a receptacle such as a tank 10 containing water, a container 11 which has a gaseous fluid confined therein and is submerged in the water for testing leakage by detecting gas bubbles B escaping therefrom and passing upwardly through the water, a transmitter 12 at the top of the tank for radiating high frequency energy into the water, and an energy receiver or sound pick-up 13 at the bottom of the tank. Preferably, the transmitter is equipped with a spherical reflector 14 adapted to distribute the energy within the tank and substantially fill the tank with waves of energy. The pick-up likewise is equipped with a reflector 15 to provide for better reception of sound energy present at any point within the tank.

The components of the electrical network embodied in the apparatus are shown in block diagram fashion in Fig. 2. Since all these components, except as otherwise explained herein, are conventional and are well known in the art, a detailed description and illustration thereof appears to be unnecessary.

The transmitting side of this network comprises a voltage regulating transformer 16 which is adapted for connection to a source or supply of alternating current and has a fifty volt output and a twenty four volt output, a rectifier 17 which may be of the bridge type connected to the twenty four volt output of the transformer for supplying current to the heaters of the various electron tubes in the network, a full wave rectifier and filter 18 connected to the fifty volt output of the transformer, an oscillator 19 serving as the high frequency energy generator connected to the output of the rectifier and filter, and an amplifier 20 connecting the transmitter 12 to the output of the oscillator.

The receiving side of the network comprises the receiver 13, high frequency amplifiers 21 and 21a connected in series to the output of the receiver, a detector 22 connected to the output of the amplifier 21a and to the output of the oscillator 19 as described hereinafter, a sensitivity control and filter 23 connected to the output of the detector, a low frequency amplifier 24 connected to the output of the filter 23, a rectifier 25 connected to the output of the amplifier 24, and a relay 26 connected to the output of the rectifier 25 for controlling the operation of an alarm or suitable indicating means.

If desired, the indicating means may include a work circuit 27 adapted to control mechanism (not shown) for removing the container from the tank and transferring the same to a station where leaky containers are collected.

As previously indicated herein, the oscillator 19 is of the low noise type and does not generate frequencies between about 100 and about 300 cycles per second which the filter 23 could pass. This is accomplished by providing a network which has positive and negative feedback. Such a network comprises positive and negative terminals 28 and 29 adapted for connection to the unidirectional current supplied through rectifier 18; an electron tube 30 having a cathode 31, a grid 32 and an anode 33; an oscillator coil having a section 34 connected between the anode and the positive terminal and having a second section 35 connected between the grid and the negative terminal; a capacitor 36 connected across the oscillator section 35; a resistor 37 and a resistor 43 in series connected between the cathode and the negative terminal; and a capacitor 38 connected across the resistor 37 and the negative terminal. The purpose of resistors 37 and 43 and capacitor 38 is to degenerate any tendency for low frequency noise by providing a greater negative feedback at audio frequencies than at radio frequencies. Thus, the resistor 43 tends to stabilize the oscillator while the resistor 37 and the capacitor 38 tend to degenerate any noise modulation of the oscillator.

The oscillator network, in its preferred form as illustrated herein, further comprises a capacitor 39 connected across the positive and negative terminals, a voltage divider 40 connected across the positive and negative terminals and having a tap 41 at the negative side through which the oscillator section 35 is connected to the negative terminal, and a capacitor 42 connected between the tap 41 and the negative terminal.

The elements of the oscillator network have electrical values to provide practically zero impedance at high frequency and high impedance at low frequency to thereby degenerate audio noise.

The output 44—45 of the oscillator network is adjusted at a frequency of the order of one megacycle per second, and all noise at a frequency lower than 900 cycles per second is degenerated by reason of the high impedence of the network at low frequency.

This one megacycle per second signal is amplified and transmitted, and is received. In order to minimize low frequency noise which may also be received by the sound pick-up, only the high frequency signal is amplified and this signal is sensed by the detector 22. The detector is also connected to directly sense a comparison signal generated by the oscillator which signal is identical to the received signal in the absence of bubbles in the tank, and the detector is arranged to have practically a zero output when the received and comparison signals are identical.

In the event a bubble passes through the liquid in the tank and the motion thereof changes the frequency of the received signal, the detector 22 by reason of its construction and arrangement has an output at a frequency equal to the difference between the frequency of the received and comparison signals.

The sensitivity control and filter network 23 is arranged to pass this output when a frequency difference of about 100 cycles per second or more is detected. However, since ambient noise at a frequency above 300 cycles per second may vibrate the tank and thereby cause a detectable frequency difference whereby the detector has an output at such frequency, the sensitivity control and filter is further arranged to pass only frequencies below about 300 cycles per second.

In a practical arrangement of the network, the filter is arranged to pass a band of frequencies between about 100 and about 200 cycles per second. In this manner, only frequency differences caused by the motion of bubbles are detected and the output of the filter is insensitive to frequency differences created by other causes. Thus, upon the presence of a bubble in the tank, the signal passed by the filter is amplified in a manner to minimize the high frequency component thereof, is rectified and is effective to operate the alarm relay.

From the foregoing description, it will be seen that the present invention provides a relatively simple, practical and economical bubble detector which is highly sensitive to the presence of bubbles, but is insensitive to false alarm causes, and thereby is accurate and reliable in operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Testing apparatus for detecting the leakage of a gaseous fluid from a container confining the same, said apparatus comprising a receptacle for containing liquid into which the container to be tested is immersed, means for generating energy of a given high frequency, means for radiating the energy into the liquid to fill the receptacle with waves of energy, means submerged in the liquid for receiving the radiated energy, means electrically connected to said generating means and said receiving means for detecting a difference in frequency between the signal generated and the signal received such as caused by a bubble of gaseous fluid escaping from the container and passing upwardly through the liquid, indicating means, and means for effecting operation of said indicating means in response to the detection of a frequency difference.

2. Testing apparatus according to claim 1, wherein said last mentioned means includes a filter for passing a given band of frequencies.

3. Testing apparatus according to claim 2, wherein said band of frequencies is between about 100 and about 300 cycles per second.

4. Testing apparatus according to claim 2, wherein said generating means is an oscillator including a resistor-capacitor arrangement having negative feedback within said given band of frequencies and being effective to degenerate audio frequencies.

5. Testing apparatus according to claim 4, wherein said oscillator has practically zero impedance at the given high frequency and has very high impedance within said band of frequencies.

6. Testing apparatus according to claim 2, wherein said filter is peaked for sensitivity to the lower frequencies within said band.

7. Testing apparatus for detecting the leakage of a gaseous fluid from a container confining the same, said apparatus comprising a receptacle for containing liquid into which the container to be tested is immersed, an oscillator for generating energy on the order of 1 megacycle per second, means for radiating the energy into the liquid to fill the receptacle with waves of energy, means submerged in the liquid for receiving the radiated energy, means electrically connected to said generating means and said receiving means for detecting a difference in frequency between the signal generated and the signal received such as caused by a bubble of gaseous fluid escaping from the container and passing upwardly through the liquid, indicating means, and means for effecting operation of said indicating means in response to the detection of a frequency difference including a filter for passing a band of frequencies between about 100 and about 300 cycles per second having a peaked sensitivity at the lower frequencies, said oscillator being degenerated for audio noise within said band of frequencies.

8. Testing apparatus for detecting the leakage of a gaseous fluid from a container confining the same, said apparatus comprising a receptacle for containing liquid into which the container to be tested is immersed, means for generating energy of a given high frequency, means submerged in the liquid for radiating the energy into the liquid including a reflector for dispersing the energy to fill the receptacle with waves of energy, means submerged in the liquid for receiving the radiated energy, means electrically connected to said generating means and said receiving means for detecting a difference in frequency between the signal generated and the signal received such as caused by a bubble of gaseous fluid escaping from the container and passing upwardly through the liquid, indicating means, and means for effecting operation of said indicating means in response to the detection of a frequency difference.

9. Testing apparatus for detecting the leakage of a gaseous fluid from a container confining the same, said apparatus comprising a receptacle for containing liquid into which the container to be tested is immersed, means for generating energy of a given high frequency, means for radiating the energy into the liquid to fill the receptacle with waves of energy, means submerged in the liquid for receiving the radiated energy including a reflector directing the energy thereto, means electrically connected to said generating means and said receiving means for detecting a difference in frequency between the signal generated and the signal received such as caused by a bubble of gaseous fluid escaping from the container and passing upwardly through the liquid, indicating means, and means for effecting operation of said indicating means in response to the detection of a frequency difference.

10. Testing apparatus for detecting the leakage of a gaseous fluid from a container confining the same, said apparatus comprising a receptacle for containing liquid into which the container to be tested is immersed, means for generating energy of a given high frequency, means submerged in the liquid for radiating the energy into the liquid including a reflector for dispersing the energy to fill the receptacle with waves of energy, means submerged in the liquid for receiving the radiated energy including a reflector directing the energy thereto, means electrically connected to said generating means and said receiving means for detecting a difference in frequency between the signal generated and the signal received such as caused by a bubble of gaseous fluid escaping from the container and passing upwardly through the liquid indicating means, and means for effecting operation of said indicating means in response to the detection of a frequency difference.

11. Testing apparatus for detecting the leakage of a gaseous fluid from a container confining the same, said apparatus comprising means for generating energy of a given high frequency, means for radiating the energy into liquid contained in a receptacle into which a container to be tested is immersed to fill the receptacle with waves of energy, means for receiving the radiated energy adapted to be submerged in the liquid, means electrically connected to said generating means and said receiving means for detecting a difference in frequency between the signal generated and the signal received such as caused by a bubble of gaseous fluid escaping from the container and passing upwardly through the liquid, indicating means, and means for effecting operation of said indicating means in response to the detection of a frequency difference.

12. The method of testing the leakage of a gaseous fluid from a container confining the same which method comprises immersing the container in a body of liquid, radiating energy of a given high frequency into the liquid to fill the body of liquid with waves of energy, receiving the radiated energy in the liquid, comparing the frequency of the radiated energy and the received energy, detecting a difference in frequency between the radiated and received energy such as caused by a bubble of gaseous fluid escaping from the container and passing upwardly through the liquid, and removing the containers from the body of liquid.

References Cited in the file of this patent

UNITED STATES PATENTS

| | | |
|---|---|---|
| 1,926,474 | Allen et al. | Sept. 12, 1933 |
| 2,008,934 | Smith | July 23, 1935 |
| 2,210,417 | Kinley | Aug. 6, 1940 |
| 2,316,842 | Coleman | Apr. 20, 1943 |
| 2,770,795 | Peterson | Mar. 30, 1951 |
| 2,628,314 | Bussard | Feb. 10, 1953 |
| 2,706,249 | Vackar | Apr. 12, 1955 |
| 2,841,775 | Saunders | July 1, 1958 |